(12) United States Patent
Hsieh

(10) Patent No.: US 11,608,973 B2
(45) Date of Patent: Mar. 21, 2023

(54) LIGHTING ASSEMBLY WITH A CONTROL MODULE

(71) Applicant: HABITEX CORPORATION, Taipei (TW)

(72) Inventor: Pei-Lin Hsieh, Taipei (TW)

(73) Assignee: HABITEX CORPORATION, Taipei (TW)

( * ) Notice: Subject to any disclaimer, the term of this patent is extended or adjusted under 35 U.S.C. 154(b) by 0 days.

(21) Appl. No.: 17/517,574

(22) Filed: Nov. 2, 2021

(65) Prior Publication Data

US 2022/0364715 A1 Nov. 17, 2022

(30) Foreign Application Priority Data

May 13, 2021 (CN) .......................... 202121017785.5

(51) Int. Cl.
*F21V 23/06* (2006.01)
*F21V 21/02* (2006.01)
*H05B 45/10* (2020.01)
*F21V 15/01* (2006.01)

(52) U.S. Cl.
CPC .............. *F21V 23/06* (2013.01); *F21V 15/01* (2013.01); *F21V 21/02* (2013.01); *H05B 45/10* (2020.01)

(58) Field of Classification Search
CPC .......... F21V 23/06; F21V 15/01; F21V 21/02; H05B 45/10
See application file for complete search history.

(56) References Cited

U.S. PATENT DOCUMENTS

2018/0003371 A1* 1/2018 Hsieh .................. F21V 23/0485
2019/0277050 A1* 9/2019 Lockwood ........... H01Q 1/1242
2019/0360648 A1* 11/2019 Hsieh ...................... F21V 21/32

* cited by examiner

*Primary Examiner* — Minh D A
(74) *Attorney, Agent, or Firm* — Ladas & Parry, LLP

(57) ABSTRACT

A lighting assembly includes a hollow post module, a lighting module, and a control module. The control module includes a casing, a circuit board, a processor, and a capacitive proximity sensor module. The casing has a casing body and a casing cover to define a receiving space. The casing cover has an outer contact surface exposed from the post module and an inner contact surface. The circuit board is elongated along a lengthwise direction of the hollow post module in the receiving space and perpendicular to the inner contact surface. The processor is connected to the lighting module. The capacitive proximity sensor module connects the circuit board and processor and abut the inner contact surface.

11 Claims, 12 Drawing Sheets

LIGHTING ASSEMBLY WITH A CONTROL MODULE

CROSS-REFERENCE TO RELATED APPLICATION

This application claims priority to Chinese Patent Application No. 202121017785.5, filed on May 13, 2021, the disclosure of which is incorporated herein by reference in its entirety.

FIELD

The disclosure relates to a lighting assembly, and more particularly to a lighting assembly with a control module.

BACKGROUND

Lighting devices currently developed are provided with lighting control modules that can adjust brightness of light as needed by users. Such lighting control modules generally need to be mounted to a large size circuit board. Therefore, the existing floor lamp has the lighting control module mounted to a base thereof.

However, because the base is placed on a floor, a person has to bend down for operation of the light control module and adjustment of light brightness. The operation in this manner is inconvenient.

SUMMARY

Therefore, one object of the disclosure is to provide a lighting assembly that can alleviate at least one of the drawbacks of the prior art.

According to one aspect of the disclosure, a lighting assembly including a light post unit, a lighting module, and a control module.

The light post unit includes a base and a hollow post module that extends upwardly from the base and that has a tubular wall, and an installation hole extending transversely through the tubular wall and elongated in a lengthwise direction of the hollow post module.

The lighting module is disposed on the hollow post module above the base.

The control module is inserted into the hollow post module through the installation hole, and has a casing body and a casing cover both elongated in the lengthwise direction of the hollow post module. The casing body and the casing cover engage and cooperate with each other to define a receiving space elongated in the lengthwise direction. The casing cover has a cover portion that has an outer contact surface and an inner contact surface opposite to the outer contact surface. The outer contact surface is exposed from the installation hole.

The circuit board is received in the receiving space, and elongated in the lengthwise direction and transverse to the inner contact surface of the cover portion.

The processor is disposed on the circuit board and electrically connected to the lighting module.

The capacitive proximity sensor module is disposed on the circuit board and electrically connected to the processor. The capacitive proximity sensor module includes a plurality of electrodes spaced apart in the lengthwise direction, and a plurality of electric conductive members contacting the inner contact surface. The electric conductive members are respectively in electrically conductive connection with the electrodes. The capacitive proximity sensor module functions to produce a sensor signal to the processor for control of the lighting module.

According to another aspect, the disclosure is to provide a control module for a lighting assembly that includes a hollow post module having an installation hole and a lighting module connected to the hollow post module. The control module includes a casing, a circuit board, a processor, and a capacitive proximity sensor module.

The casing is configured to be inserted into the installation hole of the hollow post module, and has a casing body and a casing cover. The casing body and the casing cover engage and cooperate with each other to define a receiving space configured to be elongated in a lengthwise direction of the hollow post module. The casing cover has a cover portion that has an outer contact surface and an inner contact surface opposite to the outer contact surface. The outer contact surface is configured to be exposed from the installation hole.

The circuit board is received in the receiving space, and elongated in the lengthwise direction and transverse to the inner contact surface of the cover portion.

The processor is disposed on the circuit board to be electrically connected to the lighting module.

The capacitive proximity sensor module is disposed on the circuit board and electrically connected to the processor. The capacitive proximity sensor module includes a plurality of electrodes to be arranged in the lengthwise direction of the hollow post module, and a plurality of electric conductive members contacting the inner contact surface. The electric conductive members are respectively in electrically conductive connection with the electrodes.

The capacitive proximity sensor module functions to produces a sensor signal to the processor for control of the lighting module.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
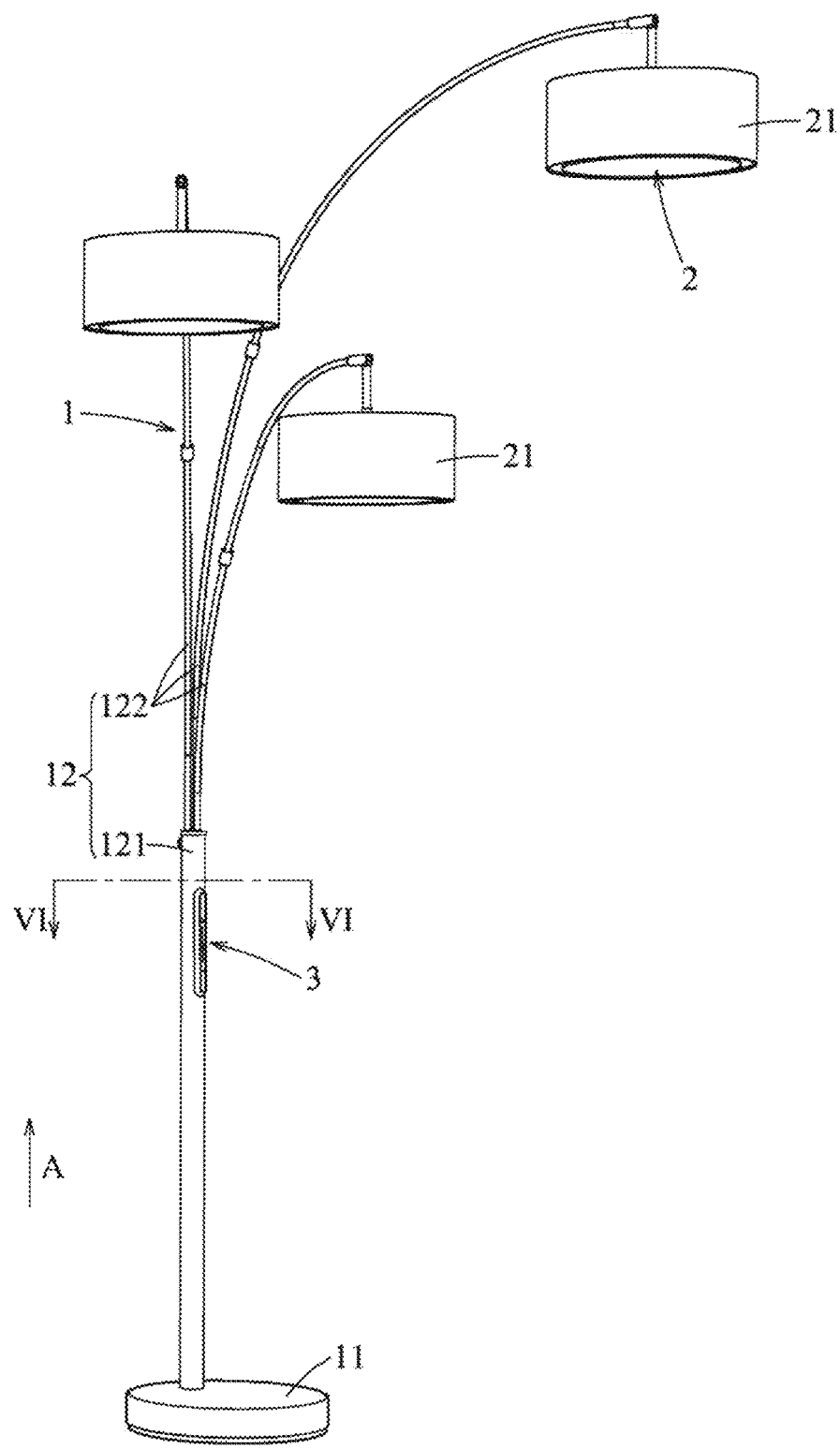
FIG. 1 illustrates a lighting assembly according to a first embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 4:
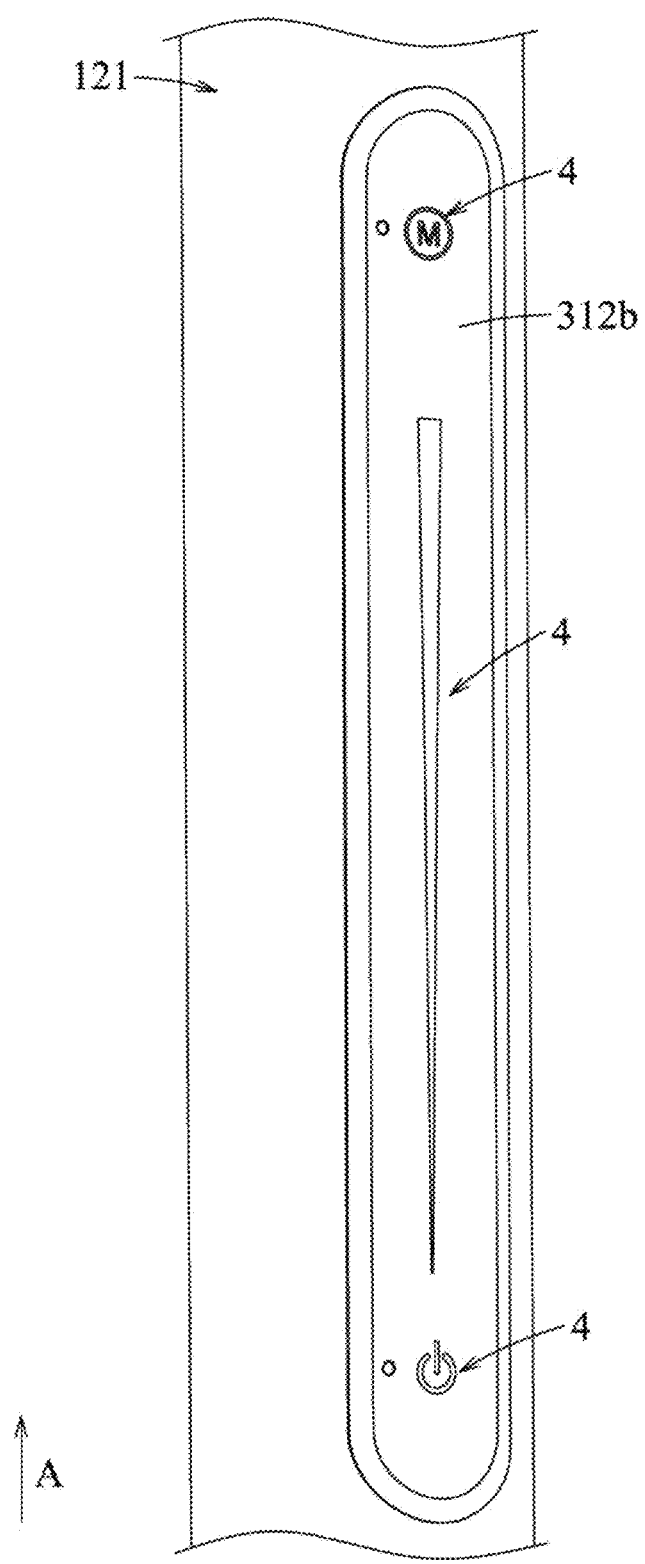
FIG. 4 is a perspective view of the first embodiment illustrating the control module assembled to the hollow post module.

FIGS. 1 and 4 illustrate a lighting assembly according to a first embodiment of the disclosure. The lighting assembly includes a light post unit 1, a lighting module 2, and a control module 3.

The light post unit 1 includes a base 11 and a hollow post module 12. The hollow post module 12 has a hollow post 121, a plurality of support rods 122, and an installation hole 123. The hollow post 121 extends in a lengthwise direction (A) of the hollow post module 12 upwardly from the base 11 and has a tubular wall 1210. The support rods 122 extend upwardly from a top of the hollow post 121. The installation hole 123 extends transversely through the tubular wall 1210 and is elongated in the lengthwise direction (A).

The lighting module 2 is disposed on the hollow post module 12 above the base 11. In this embodiment, the lighting module 2 includes a plurality of light shades 21 respectively fixed to the support rods 122 and a plurality of lighting elements (not shown) respectively disposed within the light shades 21.

The control module 3 includes a casing 31, a circuit board 32, a processor 33, and a capacitive proximity sensor module 34.

The casing 31 is inserted into the hollow post 121 through the installation hole 123, and has a casing body 311 and a casing cover 312 both elongated in the lengthwise direction (A). The casing body 311 and the casing cover 312 engage and cooperate with each other to define a receiving space 313 elongated in the lengthwise direction (A). The casing cover 312 has a cover portion 312a that has an outer contact surface 312b and an inner contact surface 312c opposite to the outer contact surface 312b. The outer contact surface 312b is exposed from the installation hole 123.

The circuit board 32 has a welding surface 321 and a lateral edge face 322 facing the inner contact surface 312c of the casing cover 312. The circuit board 32 is received in the receiving space 313, and is elongated in the lengthwise direction (A). To reduce the width of the casing 31, the circuit board 32 is transverse to, particularly, perpendicular to the inner contact surface 312c of the cover portion 312a so that the casing 31 can be fitted into the hollow post module 12 with a smaller diameter.

The processor 33 is disposed on the circuit board 32 and electrically connected to the lighting module 2.

The capacitive proximity sensor module 34 is disposed on the circuit board 32 and electrically connected to the processor 33. The capacitive proximity sensor module 34 includes a plurality of electrodes 341 spaced apart in the lengthwise direction (A), and a plurality of electric conductive members 342 contacting the inner contact surface 312c. The electric conductive members 342 are respectively in electrically conductive connection with the electrodes 341. In this embodiment, the electrodes 341 are disposed on the welding surface 321. The electric conductive members 342 project from the lateral edge face 322 to abut the inner contact surface 312c. Each electric conductive member 342 has a conductive sponge.

When a part of a person is in close proximity to the outer contact surface 312b, it is in close proximity to the electric conductive members 342 abutting the inner contact surface 312c. In this situation, the capacitive proximity sensor module 34 functions to produce a sensor signal to the processor 33 for control of the lighting module 2. In this embodiment, as shown in FIG. 4, the outer contact surface 312b of the casing cover 312 is printed with indication patterns 4 respectively corresponding to the electric conductive members 342.

Figure 2:
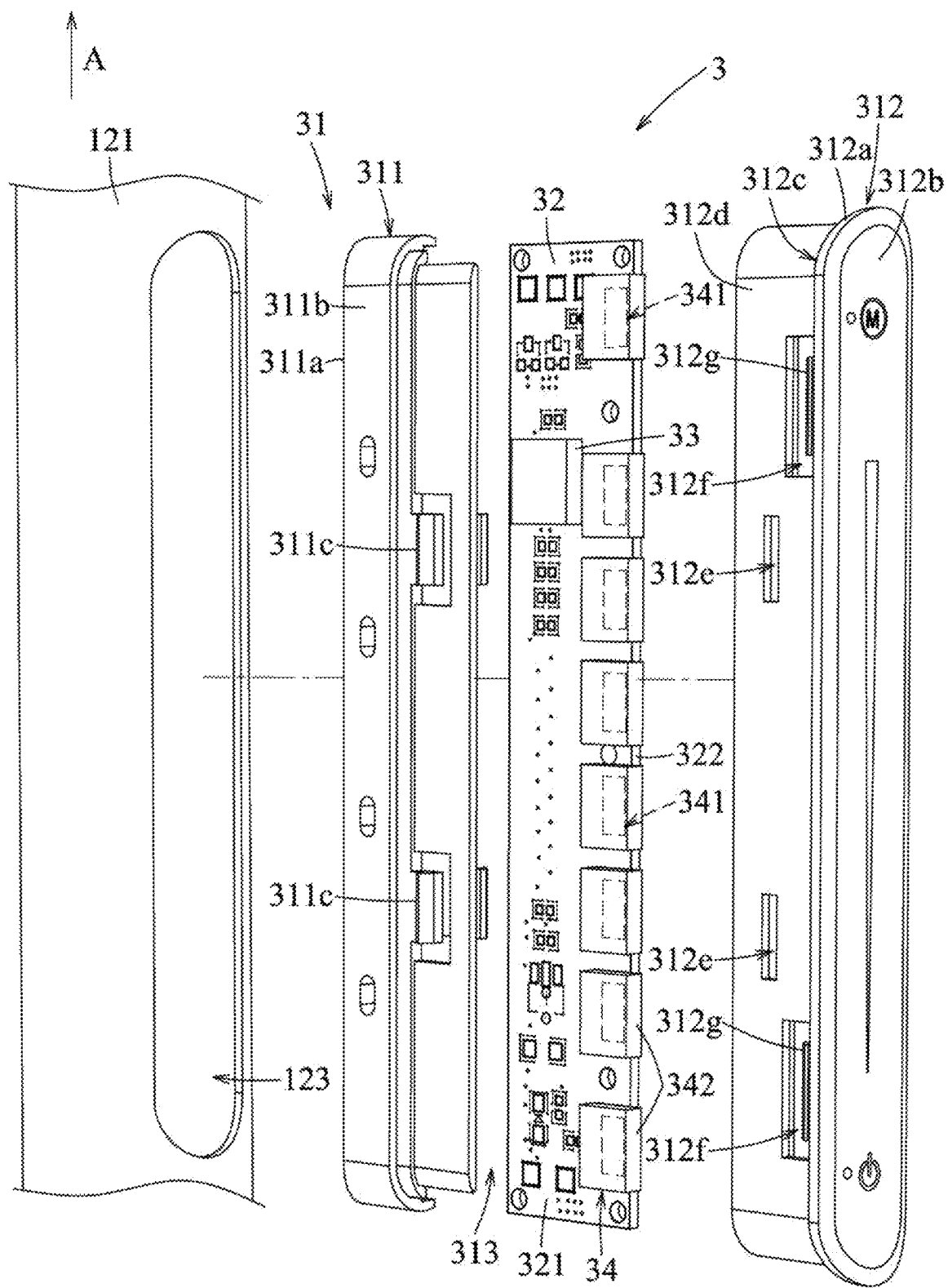
FIG. 2 is an exploded perspective view illustrating a hollow post module and a control module of the first embodiment.
Figure 3:
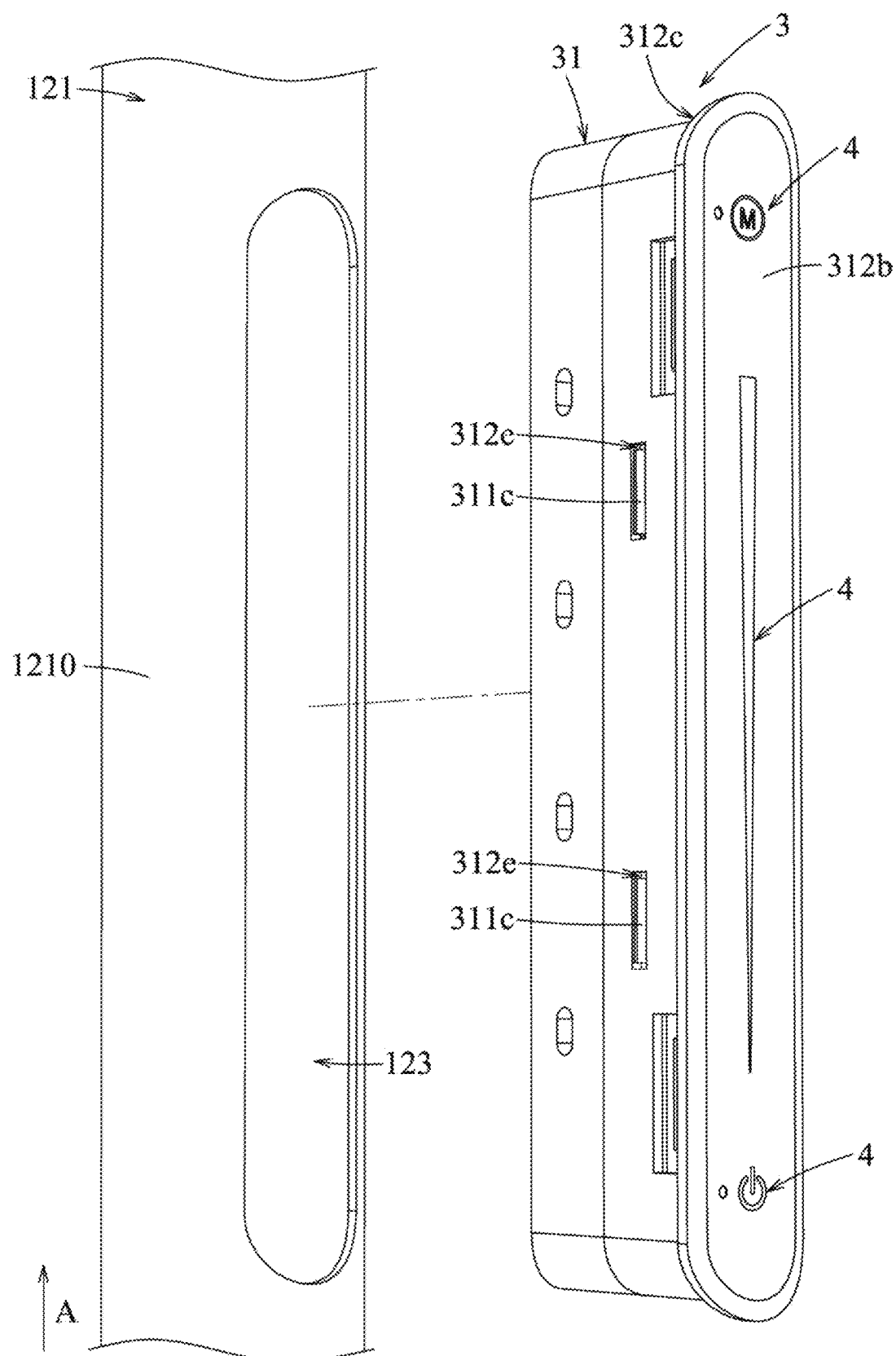
FIG. 3 is a view similar to that of FIG. 2, but illustrating the control module in an assembled state.

As shown in FIGS. 2 to 4, the casing cover 312 further has a first surrounding wall 312d extending from the inner contact surface 312c toward the casing body 311, and a plurality of engaging holes 312e disposed on the first surrounding wall 312d. The engaging holes 312e are spaced apart from each other in the lengthwise direction (A). The cover portion 312a of the casing cover 312 protrudes outwardly from the installation hole 123.

The casing body 311 has a base wall 311a, a second surrounding wall 311b and a plurality of engaging members 311c. The second surrounding wall 311b extends toward the casing cover 312 from the base wall 311a. The engaging members 311c extend from the second surrounding wall 311b and respectively engaging the engaging holes 312e for interlocking of the casing body 311 and the casing cover 312.

Figure 5:
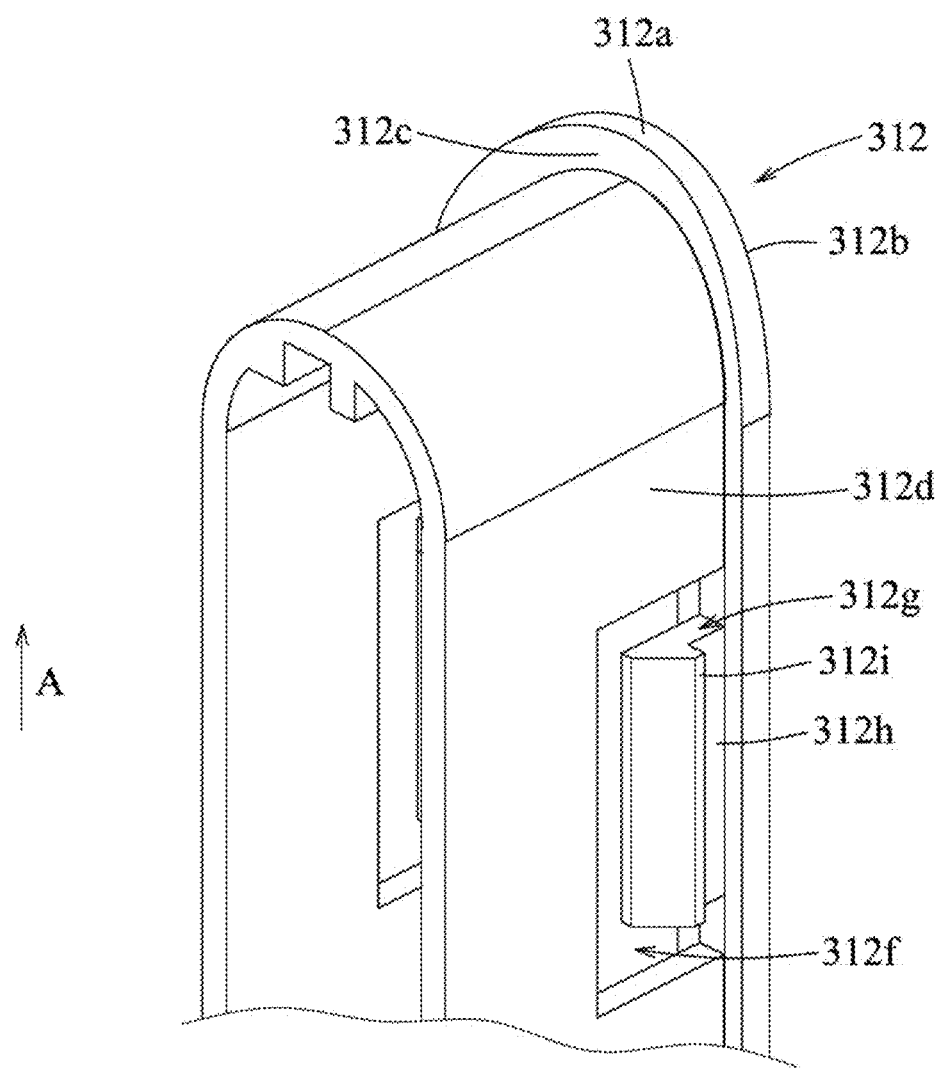
FIG. 5 is an enlarged perspective view illustrating a casing cover of the first embodiment.
Figure 6:
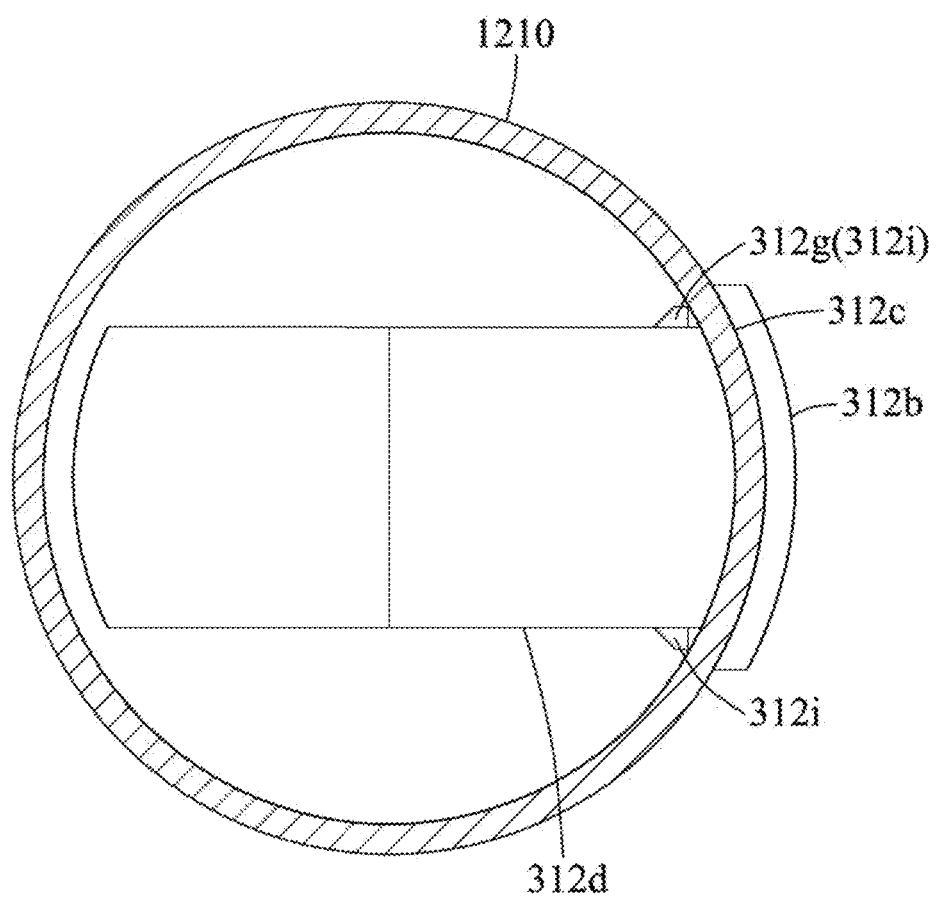
FIG. 6 is a top sectional view taken along line VI-VI of FIG. 1.

Referring to FIGS. 5 and 6 in combination with FIG. 2, the casing cover 312 further has a plurality of through holes 312f formed in the first surrounding wall 312d and adjacent to the inner contact surface 312c. The casing 31 further had a plurality of resilient barb members 312g protruding outwardly from an outer surface of the first surrounding wall 312d proximally to the cover portion 312a. The resilient barb members 312g are connected to the inner contact surface 312c of the cover portion 312a and respectively extend into the through holes 312f. The resilient barb members 312g engage an inner surface of the tubular wall 1210 of the hollow post 121 to secure the casing 31 to the hollow post module 12. Each resilient barb member 312g has an arm portion 312h directly connected to the inner contact surface 312c and extending toward the casing body 311 within one of the through holes 312f, and a barb portion 312i disposed on a free end of the arm portion 312h and protruding outwardly from the respective through hole 312f and the outer surface of the first surrounding wall 312d. The barb portions 312i of the barb member 312g abut the inner surface of the tubular wall 1210 of the hollow post module to prevent escape of the control module 3 from the installation hole 123.

Figure 10:
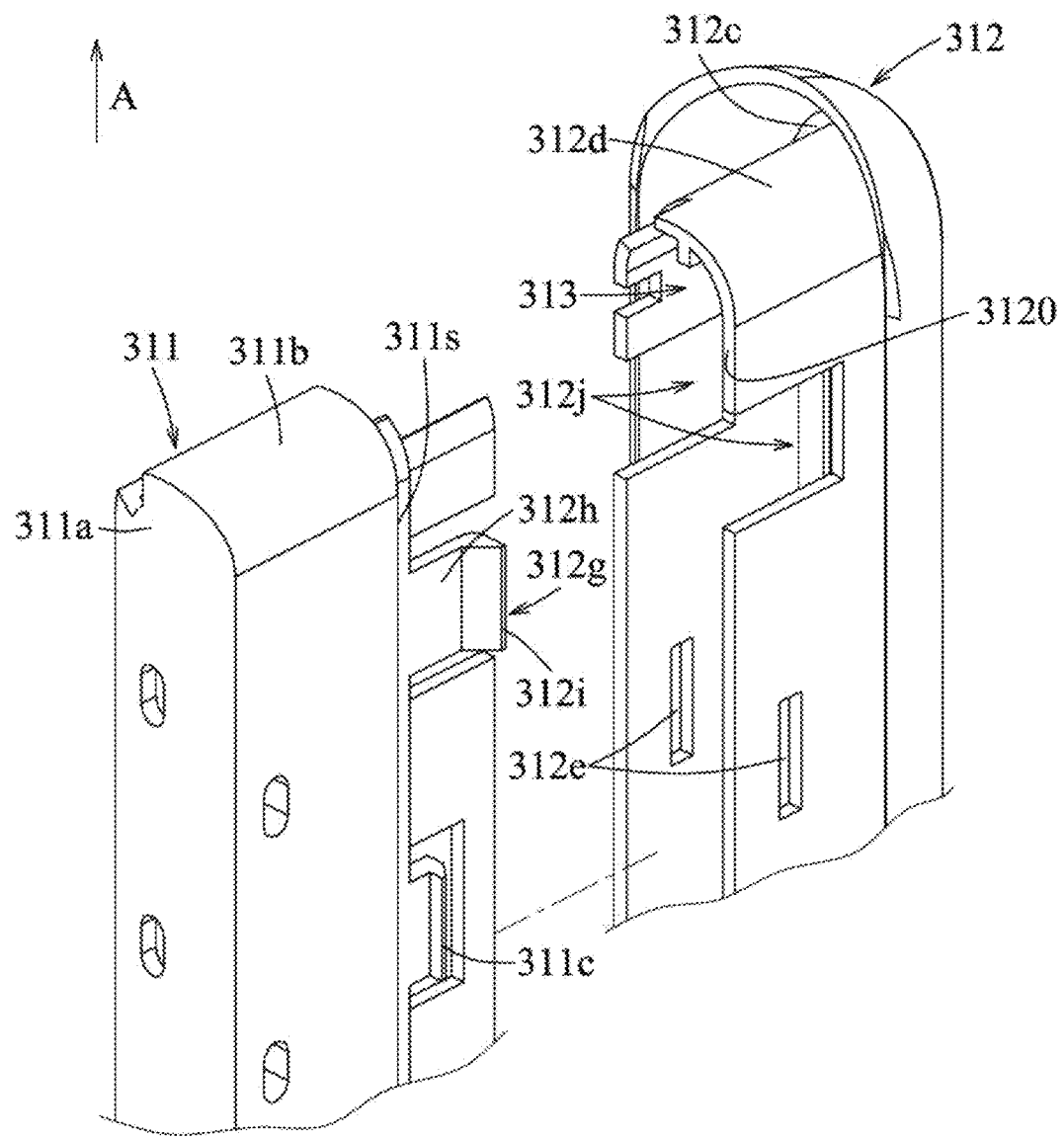
FIG. 10 is an enlarged exploded perspective view illustrating a casing body and a casing cover of the second embodiment.

FIGS. 7 to 10 illustrate a lighting assembly according to a second embodiment of the disclosure, which has a structure generally similar to that of the first embodiment. However, in this embodiment, the resilient barb members 312g are formed integrally with the casing body 311, and the casing cover 312 has neither resilient barb member 312g nor through holes 312f. As shown in FIG. 10, the first surrounding wall 312d of the casing cover 312 has a wall edge face 3120 that is distal to the inner contact surface 312c and that abuts the second surrounding wall 311b of the casing body 311, and a plurality of notches 312*j* each formed in the first surrounding wall 312*d* and opening at the wall edge face 3120.

Figure 7:
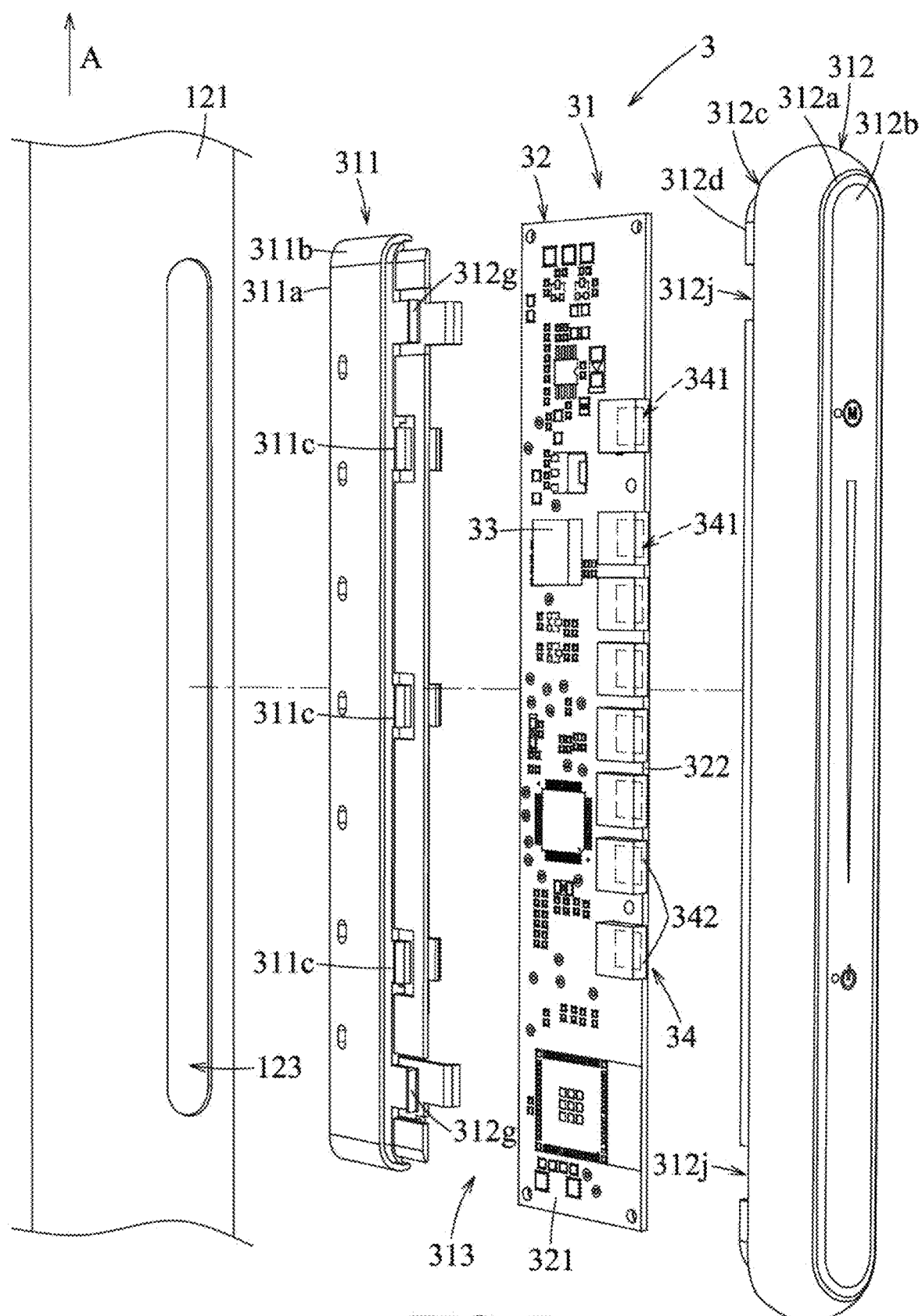
FIG. 7 is an exploded perspective view illustrating a control module and the hollow post module of a lighting assembly according to a second embodiment of the disclosure.
Figure 8:
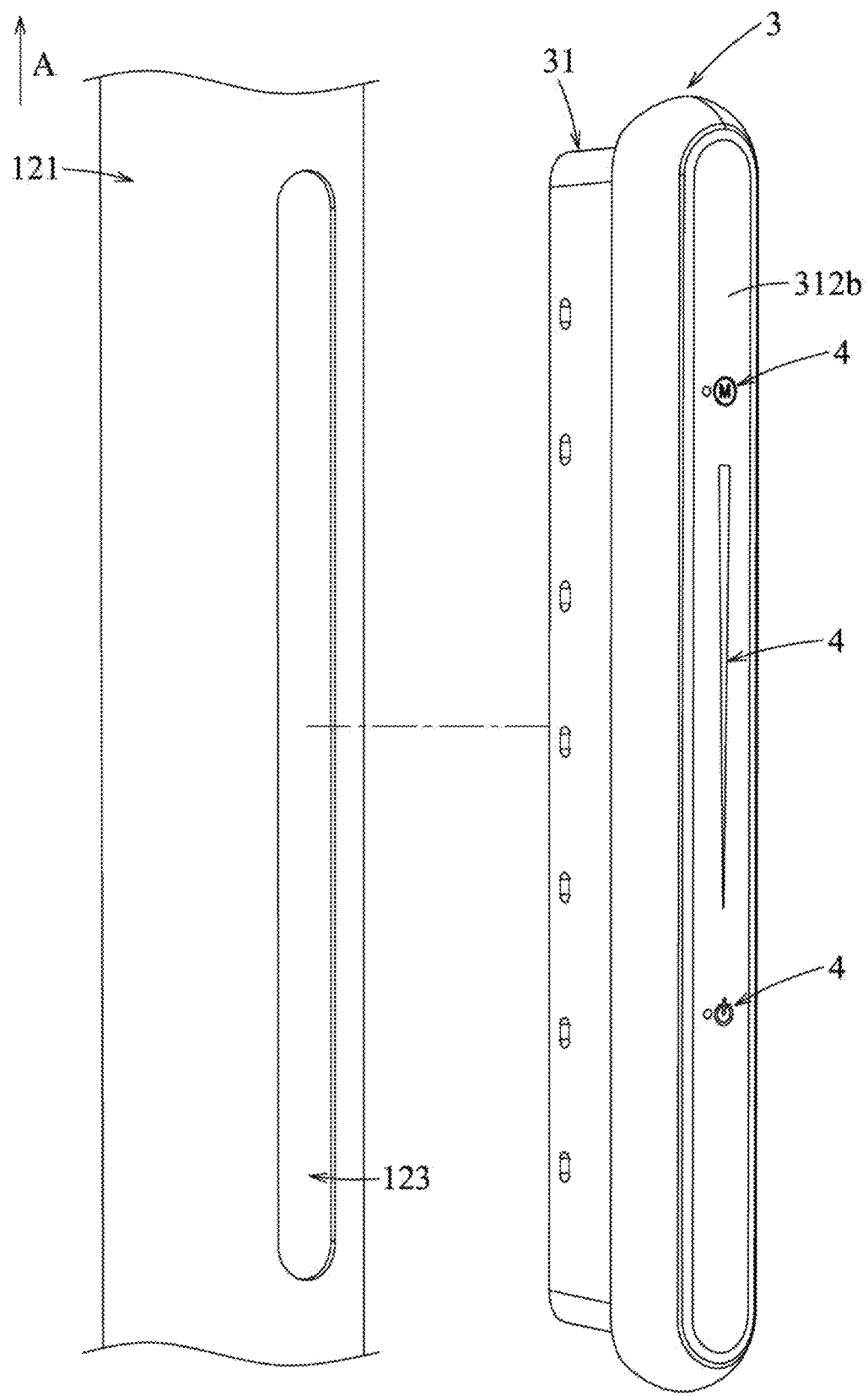
FIG. 8 is a view similar to that of FIG. 7, but illustrating the control module in an assembled state.
Figure 9:
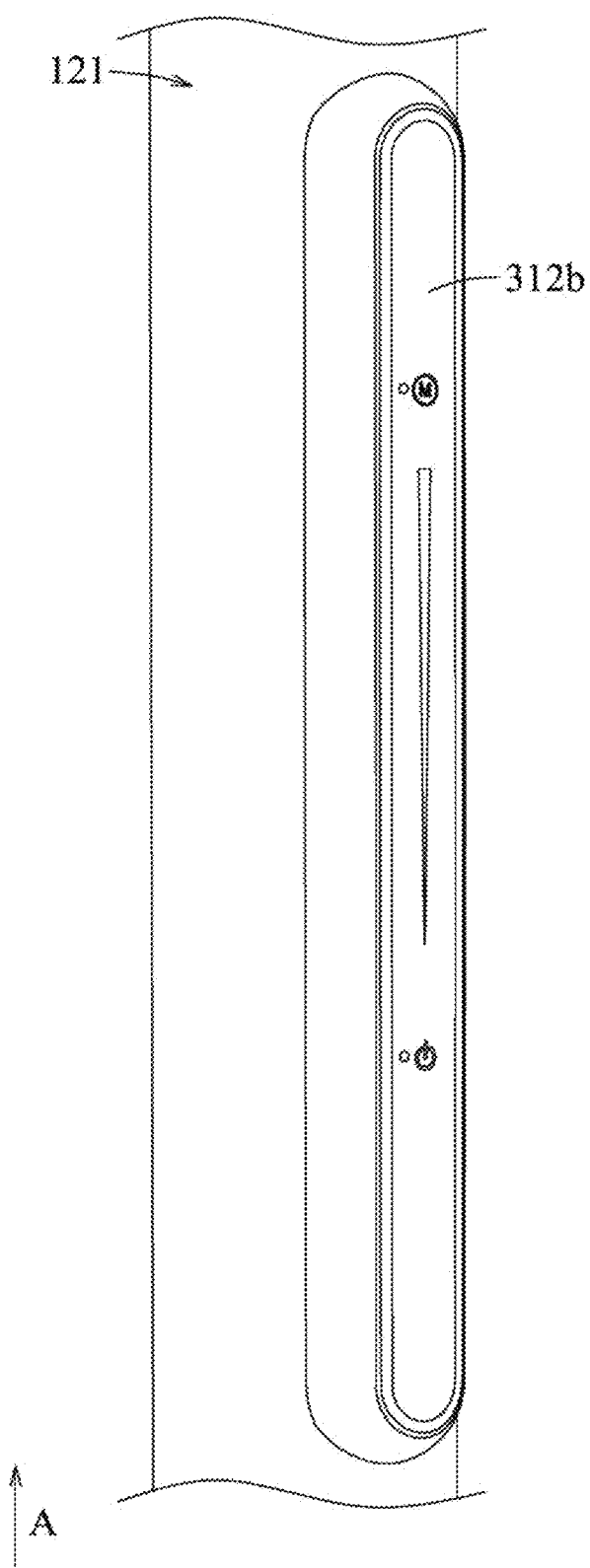
FIG. 9 is a perspective view of the second embodiment illustrating the control module assembled to the hollow post module.
Figure 12:
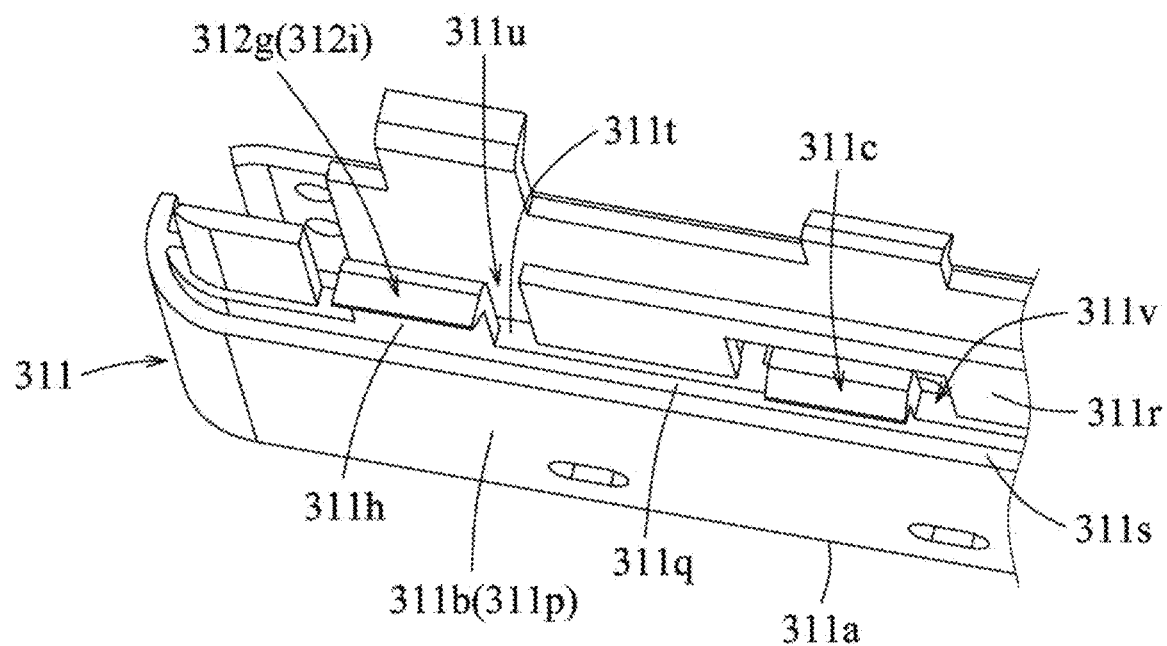
FIG. 12 is an enlarged perspective view illustrating the casing body of the second embodiment.

Referring to FIG. 12 in combination with FIGS. 7 and 10, the second surrounding wall 311*b* of the casing body 311 is a stepped wall and has a first section 311*p* directly connected to the base wall 311*a*, a second section 311*q* connected to the first section 311*p* opposite the base wall 311*a*, a third section 311*r* connected to the second section 311*q* opposite the first section 311*p*, a first shoulder face 311*s* formed at the junction of the first and second sections 311*p*, 311*q*, and a second shoulder face 311*t* formed at the junction of the second and third sections 311*q*, 311*r*. The first shoulder face 311*s* indents from the outer surface of the first section 311*p*. The second shoulder face 311*t* indents from the outer surface of the second section 311*q*. When the casing body 311 and the casing cover 312 are assembled together, the wall edge face 3120 of the first surrounding wall 312*d* of the casing cover 312 abuts with the first shoulder face 311*s* of the second surrounding wall 311*b*.

The resilient barb members 312*g* project from the second shoulder face 311*s* of the second surrounding wall 311*b* and extend towards the notches 312*j*, respectively. Particularly, each resilient barb member 312*g* has an arm portion 312*h* directly connected to the second shoulder face 311*s* of the second surrounding wall 311*b* and extending toward the respective notch 312*j* of the casing cover 312, and a barb portion 312*i* disposed on a free end of the arm portion 312*h* and protruding outwardly from the outer surface of the first surrounding wall 312*d* of the casing cover 312 through the respective notch 312*j*. The third section 311*r* of the second surrounding wall 311*b* of the casing body 311 are formed with openings 311*u* in proximity to the respective resilient barb members 312*g*, and holes 311*v* in proximity to the respective engaging members 311*c*.

Figure 11:
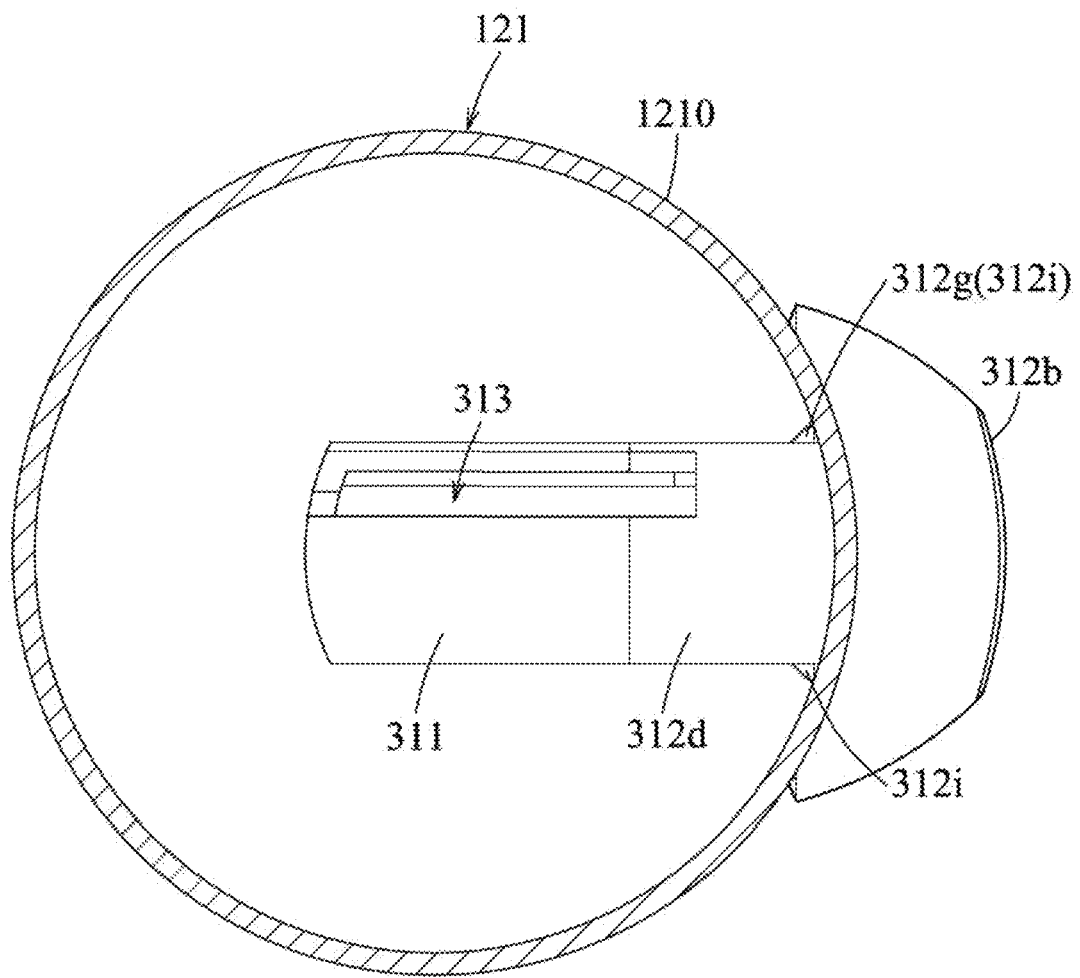
FIG. 11 is a top sectional view of the second embodiment illustrating the control module assembled to the hollow post module.

As shown in FIG. 11, the barb portions 312*i* of the resilient barb member 312*g* abut the inner surface of the tubular wall 1210 of the hollow post module to prevent escape of the control module 3 from the installation hole 123.

To sum up, to reduce the width of the casing 31, the circuit board 32, which is received in the receiving space 313 of the casing 31 in the lengthwise direction (A), has the lateral edge 322 thereof placed perpendicular to and facing the inner contact surface 312*c* of the cover portion 312*a* so that the casing 31 can be fitted into the hollow post module 12 with a smaller diameter. Further, by virtue of the electric conductive members 342 contacting the inner contact surface 312*c* of the casing cover 312 and being respectively in electrically conductive connection with the electrodes 341, the capacitive proximity sensor module 34 can produce a sensor signal to the processor 33 for control of the lighting module 2 when a part of a person is in close proximity to the outer contact surface 312*b*. Because the casing 31 is inserted into the hollow post 121 through the installation hole 123 above the base 11, the lighting assembly of the disclosure is convenient for a person to operate the control module 3 without bending down for control of light module 2.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A lighting assembly, comprising:
    a light post unit including a base and a hollow post module that extends upwardly from said base and that has a tubular wall, and an installation hole extending transversely through said tubular wall and elongated in a lengthwise direction of said hollow post module;
    a lighting module disposed on said hollow post module above said base;
    a control module including
        a casing inserted into said hollow post module through said installation hole, and having a casing body and a casing cover both elongated in the lengthwise direction of said hollow post module, said casing body and said casing cover engaging and cooperating with each other to define a receiving space elongated in the lengthwise direction, said casing cover having a cover portion that has an outer contact surface and an inner contact surface opposite to said outer contact surface, said outer contact surface being exposed from said installation hole,
        a circuit board received in said receiving space, and elongated in the lengthwise direction and transverse to said inner contact surface of said cover portion,
        a processor disposed on said circuit board and electrically connected to said lighting module, and
        a capacitive proximity sensor module disposed on said circuit board and electrically connected to said processor, said capacitive proximity sensor module including a plurality of electrodes spaced apart in the lengthwise direction, and a plurality of electric conductive members contacting said inner contact surface, said electric conductive members being respectively in electrically conductive connection with said electrodes; and
    wherein said capacitive proximity sensor module functions to produce a sensor signal to said processor for control of said lighting module.

2. The lighting assembly as claimed in claim 1, wherein:
    said casing cover further has a first surrounding wall extending toward said casing body, and a plurality of engaging holes disposed on said first surrounding wall; and
    said casing body has a base wall, a second surrounding wall and a plurality of engaging members, said second surrounding wall extending toward said casing cover from said base wall, said engaging members extending from said second surrounding wall and respectively engaging said engaging holes.

3. The lighting assembly as claimed in claim 1, wherein said cover portion of said casing cover protrudes outwardly from said installation hole, said casing further having a plurality of resilient barb members protruding outwardly from an outer surface of said first surrounding wall proximally to said cover portion and engaging an inner surface of said tubular wall of said hollow post module to secure said casing to said hollow post module.

4. The lighting assembly as claimed in claim 3, wherein said casing cover further has a plurality of through holes formed in said first surrounding wall and adjacent to said inner contact surface, said resilient barb members connected to said inner contact surface and respectively extending into said through holes.

5. The lighting assembly as claimed in claim 4, wherein each of said resilient barb members has an arm portion connected to said inner contact surface and extending toward said casing body within one of said through holes, and a barb portion disposed on a free end of said arm portion and protruding outwardly from said one of said through holes and said outer surface of said first surrounding wall.

6. The lighting assembly as claimed in claim 3, wherein said first surrounding wall of said casing cover has a wall edge face that is distal to said inner contact surface and that abuts said second surrounding wall of said casing body, and a plurality of notches each formed in said first surrounding wall and opening at said wall edge face; and said resilient barb members project from said second surrounding wall and respectively extend to said notches.

7. The lighting assembly as claimed in claim 6, wherein each of said resilient barb members has an arm portion connected to said second surrounding wall and extending to one of said notches, and a barb portion disposed on a free end of said arm portion and protruding outwardly from said outer surface of said first surrounding wall through said one of said notches.

8. The lighting assembly as claimed in claim 1, wherein each of said electric conductive members has a conductive sponge.

9. The lighting assembly as claimed in claim 1, wherein said circuit board has a welding surface on which said electrodes are disposed, and a lateral edge face facing said inner contact surface of said casing cover; and said electric conductive members are respectively and electrically connected to said electrodes, and project from said lateral edge face to abut said inner contact surface.

10. The lighting assembly as claimed in claim 1, wherein said outer contact surface of said casing cover is printed with indication patterns respectively corresponding to said electric conductive members.

11. A control module for a lighting assembly that includes a hollow post module having an installation hole and a lighting module connected to the hollow post module, the control module comprising:

a casing configured to be inserted into the installation hole of the hollow post module, and having a casing body and a casing cover, said casing body and said casing cover engaging and cooperating with each other to define a receiving space configured to be elongated in a lengthwise direction of the hollow post module, said casing cover having a cover portion that has an outer contact surface and an inner contact surface opposite to said outer contact surface, said outer contact surface being configured to be exposed from the installation hole;

a circuit board received in said receiving space, and elongated in the lengthwise direction and transverse to said inner contact surface of said cover portion;

a processor disposed on said circuit board to be electrically connected to the lighting module;

a capacitive proximity sensor module disposed on said circuit board and electrically connected to said processor, said capacitive proximity sensor module including a plurality of electrodes to be arranged in the lengthwise direction of the hollow post module, and a plurality of electric conductive members contacting said inner contact surface, said electric conductive members being respectively in electrically conductive connection with said electrodes; and wherein said capacitive proximity sensor module functions to produces a sensor signal to said processor for control of the lighting module.

* * * * *